United States Patent [19]
Bahjat

[11] 3,864,667
[45] Feb. 4, 1975

[54] APPARATUS FOR SURFACE WAVE PARAMETER DETERMINATION

[75] Inventor: Dhari S. Bahjat, Ponca City, Okla.

[73] Assignee: Continental Oil Company, Ponca City, Okla.

[22] Filed: Sept. 11, 1970

[21] Appl. No.: 71,488

[52] U.S. Cl.... 340/15.5 SW, 340/15.5 SS, 340/15.5 R
[51] Int. Cl............................................. G01v 1/28
[58] Field of Search........... 340/15.5 SS, 15.5 DP, 340/15.5 SW, 340/15.5 MC, 15.5 R

[56] References Cited
UNITED STATES PATENTS

| | | | |
|---|---|---|---|
| 2,354,548 | 7/1944 | Ricker...................... | 340/15.5 SW |
| 3,015,086 | 12/1961 | Heintz........................... | 181/.5 VM |

*Primary Examiner*—Maynard R. Wilbur
*Assistant Examiner*—H. A. Birmiel
*Attorney, Agent, or Firm*—William J. Miller

[57] ABSTRACT

An improved method and apparatus for determining the parameters of a near surface layer and particularly the parameters of the weathering layer utilizing the variation of phase velocity with respect to frequency of surface waves generated by a continuously varying frequency signal and subsequently utilizing the determined parameters of the weathering layer to calculate a time correction factor to correct the reflection traces of a seismogram.

3 Claims, 4 Drawing Figures

APPARATUS FOR SURFACE WAVE PARAMETER DETERMINATION

BACKGROUND OF THE INVENTION

1. Field of the Invention

This invention relates generally to the improvements in wave propagation methods for determining the earth structure and, more particularly, but not by way of limitation, to a method and apparatus for determining various parameters of the weathering layer.

2. Description of the Prior Art

In seismic surveying a seismic impulse is generated at or near the surface of the earth and a portion of that impulse propagates downwardly through the various lithological formations. Portions of the seismic impulse are reflected to the surface by the interfaces between layers or beds of differing seismic velocity characteristics. These reflections are detected at the surface by geophones and recorded against elapsed time to produce what is known generally in the art as a seismogram. The seismogram provides basically the two way travel time required for the seismic energy to propagate downwardly to the various interfaces and be reflected back to the surface.

In general, there are two types of wave signals which will propagate through the earth as a result of a physical disturbance at the surface and thereby be usable for seismic surveying purposes. The most common is the so-called pressure wave which is sometimes referred to as a compression or longitudinal wave because the earth particle motion is in a direction of wave propagation. The other is referred to in the art as a shear wave, so-called because it results from particle motion generally normal to the direction of wave propagation.

For many years a seismic signal was generated by an explosion blast which produced a substantially instantaneous high peak energy. One of the salient problems encountered in analyzing wave forms produced by an explosion or an instantaneous type of disturbance in the earth has been that the waves thus produced have been extremely complex and also such disturbances produced a large amount of undesirable random noise. In more recent times, improved methods of geophysical surveying have been developed which utilize a signal of a relatively low frequency level but having a nonrepetitive, controlled frequency content and relatively long duration. An example of the latter type of seismic signal and seismic method using the same are described in U.S. Pat. No. 2,688,124, issued to Doty et al. on Aug. 31, 1954, and assigned to the assignee of the present invention.

In the past, surface wave phase velocity from a natural source, such as an earthquake, or from an explosion blast, which was generally discharged at a particular depth in the earth, has been utilized for determining the thickness of the earth's crust and the thickness of a sedimentary section. The various techniques of utilizing surface wave phase velocity in this manner have been described in the *Geological Society American Bulletin*, Vol. 67, pages 1647-1658; *Geophysics*, 1956, Vol. 21, No. 21, pages 285-298; and in *Geophysics*, 1957, Vol. 22, No. 2, pages 275-285.

It is important that the parameters of the near surface or weathering layer be accurately determined, if an accurate interpretation of the reflected traces recorded at the geophone positions is to be obtained.

SUMMARY OF THE INVENTION

The present invention contemplates a method for determining the parameters of a near surface layer of the earth, for utilization in determining a time correction factor to be applied to the reflection traces of a seismogram. A seismic signal of continuously varying frequency is generated through the earth, and the surface wave component of that seismic signal is detected at a remote location by two geophones which are spaced a distance apart. The observed frequency and the observed phase shift of the surface waves thus produced are measured and recorded. The observed phase velocity as a function of observed frequency is determined and plotted utilizing the observed phase shift and the observed frequency. A corresponding near surface model having a known near surface model phase velocity versus near surface model frequency relationship, corresponding to the observed phase velocity versus observed frequency relationship is determined. The various parameters of this corresponding near surface model are the parameters of the near surface layer which are then utilized to determine the time correction factor.

An object of the invention is to provide an improved method for determining the parameters of a near surface layer.

Another object of the invention is to provide a method for more accurately correcting the reflection traces of a seismogram.

One other object of the invention is to provide an improved method for determining the thickness, the compressional wave velocity, the shear wave velocity, and the density of the weathering layer.

One further object of the invention is to provide an improved method for determining the parameters of a weathering layer which can be economically and efficiently utilized in seismic prospecting.

One additional object of the invention is to provide an improved apparatus for determining the phase shift and frequency of a seismic signal.

Other objects and advantages of the invention will be evident from the following detailed description when read in conjunction with the accompanying drawings which illustrate the method of the invention.

DESCRIPTION OF THE PREFERRED EMBODIMENT

Figure 1:
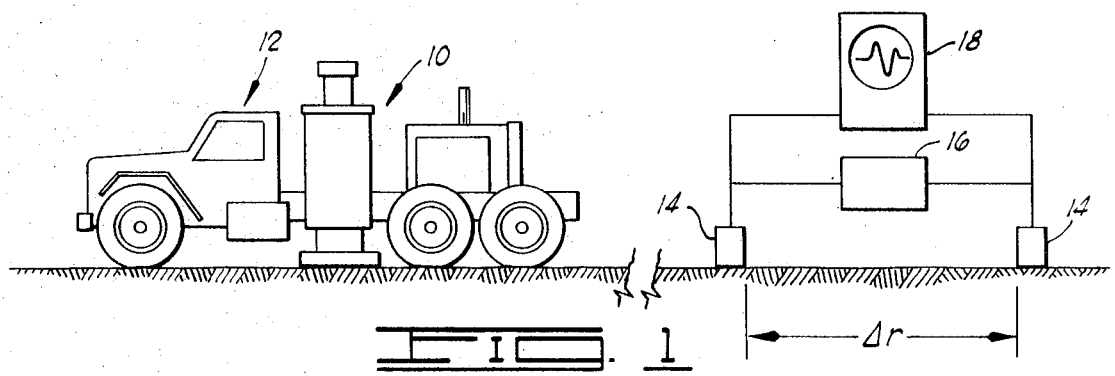
FIG. 1 is a diagrammatic illustration of the apparatus and field set-up utilized to determine a particular observed phase shift and an observed frequency of the surface waves at a particular observed test location.

In seismic surveying, the waves generated by a source are detected by a device known in the art as a geophone and recorded. The interpretation of the reflection traces thus recorded yield information concerning, for example, the location and shape of various subsurface interfaces. In a large number of instances, the material near the surface of the earth has a lower velocity component as compared to deeper formations. Thus, a reflected wave will travel at a relatively lower velocity through the near surface layer, which is generally referred to in the art and below as the weathering layer.

In interpreting the recorded information or reflection traces, a correction factor must thus be applied to the recorded, reflected traces to compensate for the difference in the velocity of the wave travel through the weathering layer, otherwise an erroneous interpretation of the sub-surface formations is probable. This correction factor is known in the art as a "time correction factor" and, broadly speaking, is utilized to shift the recorded, reflected wave traces in such a manner as to compensate for the travel time through the weathering layer, so that the corrected, recorded wave traces will accurately reflect the various sub-surface interfaces. To more accurately determine the time correction factor, various parameters such as thickness, density, shear wave velocity and compression wave velocity of the weathering layer must be accurately determined.

Referring more particularly to the present invention, illustrated in the drawings and described in detail below, is a method and apparatus for determining the various parameters of the weathering layer utilizing the dispersive properties of the surface waves generated by a continuously varying frequency source. The field geophysical prospecting apparatus and arrangement thereof which are utilized in the present invention are diagrammatically shown in FIG. 1.

As shown in FIG. 1, a seismic signal source 10, which is adapted to generate a seismic sweep signal having a relatively low energy level but of a nonrepetitive, control frequency content and of a relatively long duration, is supported on a movable vehicle 12. In this type of seismic surveying equipment the seismic sweep signal is generated by a suitable transducer, which may be electrically, mechanically, or hydraulically powered, but in any event is operated in close synchronization with the reference sweep signal so as to reproduce the above described seismic sweep signal in the form of seismic energy in the earth. The seismic signal persists for several seconds over which period of time it may vary between a low frequency, for example, in the order of 10 cycles per second, and a high frequency, for example, in the order of 100 cycles per second. Apparatus adapted to generate a seismic sweep signal such as described above is available in the art and one example of such apparatus has been described in its various aspects in U.S. Pat. Nos. 2,688,124; 2,808,577; 2,874,795; 2,910,134; 2,981,928 and 3,300,754, all of which are assigned to the assignee of the present invention, and thus further detailed description of this type of equipment is necessary herein.

The seismic signal generated by the source 10, propagates downwardly in a vertical direction and a portion of seismic energy is reflected by each successive interface and travels back to the surface where it is detected by geophones and recorded by some suitable means. This particular type of wave is referred to in the art as a compressional or "P" wave.

The disturbance induced in the earth surface by the source 10 also generates what is referred to in the art as surface waves which are guided by the free surface of the earth. The surface waves are generally known to be dispersive, that is, surface waves of different frequencies travel with correspondingly different velocities.

As shown in FIG. 1, a pair of geophones 14 are disposed on the surface of the earth at a distance from the seismic signal source 10. The geophones 14 are separated by a predetermined distance designated in FIG. 1 by the reference $\Delta r$ which, in a preferred form, may vary from 50 feet to 100 feet.

The output of each geophone 14 is connected to a frequency counter 16 and to a cathode-ray tube, or oscilloscope 18. As shown in FIG. 1, the frequency counter 16 and oscilloscope 18 are in parallel.

Thus, the frequency of the waves detected by the geophones 14 is measured by the frequency counter 10, and the oscilloscope 18 measures the phase shift between the waves detected by each of the geophones 14.

Since the reflected waves travel generally vertically with respect to the earth's surface, while the surface waves travel generally horizontally along the surface of the earth, the phase shift of the reflected waves will be negligible as compared with the phase shift produced by the surface waves. Thus, the frequency counter 16 and the oscilloscope 18 cooperate with the geophones 14 to produce a phase shift versus frequency relationship for the surface waves generated by the seismic signal source 10. The phase shift and frequency of the surface waves are recorded, or a permanent record is made of same, by a suitable means. Apparatus for recording and storing such information is well known in the art and no further description is required herein.

This information, that is the phase shift and frequency data referred to above, is obtained in the field and related to a particular location or disposition of the geophones 14 and the inter-connected frequency counter 16 and oscilloscope 18 on the earth's surface, referred to below as an observed test location for purpose of clarity of description. Also for the purpose of clarity of description, the information or observed data thus obtained will be referred to below as the observed phase shift and the observed frequency.

Utilizing the observed data obtained in a manner as described above, the phase velocity of the surface wave is then calculated or determined as a function of the observed frequency. The phase velocity is generally defined in the art as a local velocity of propagation of a point of constant phase such as a trough or a peak, and depends on the structure over which the velocity measurement is made. However, it should be noted that the phase velocity does not require a knowledge of the particular structures transversed earlier by the surface waves. The phase velocity thus calculated is referred to below as the "observed phase velocity" for the purpose of clarity.

The observed phase velocity is then determined utilizing the observed data and the following algebraic relationship:

$$c = 2\pi f \Delta r / \Delta \Phi$$

wherein:

$c$ = the computed observed phase velocity;

$\Delta r$ = the distance between the geophones 14 at a particular observed test location;

$f$ = the observed frequency as measured by the frequency counter 16 at a particular observed test location; and $\Delta \Phi$ = the observed phase shift as measured by the oscilloscope 18 at a particular observed test location and corresponding to the particular observed frequency referred to above.

Figure 2:
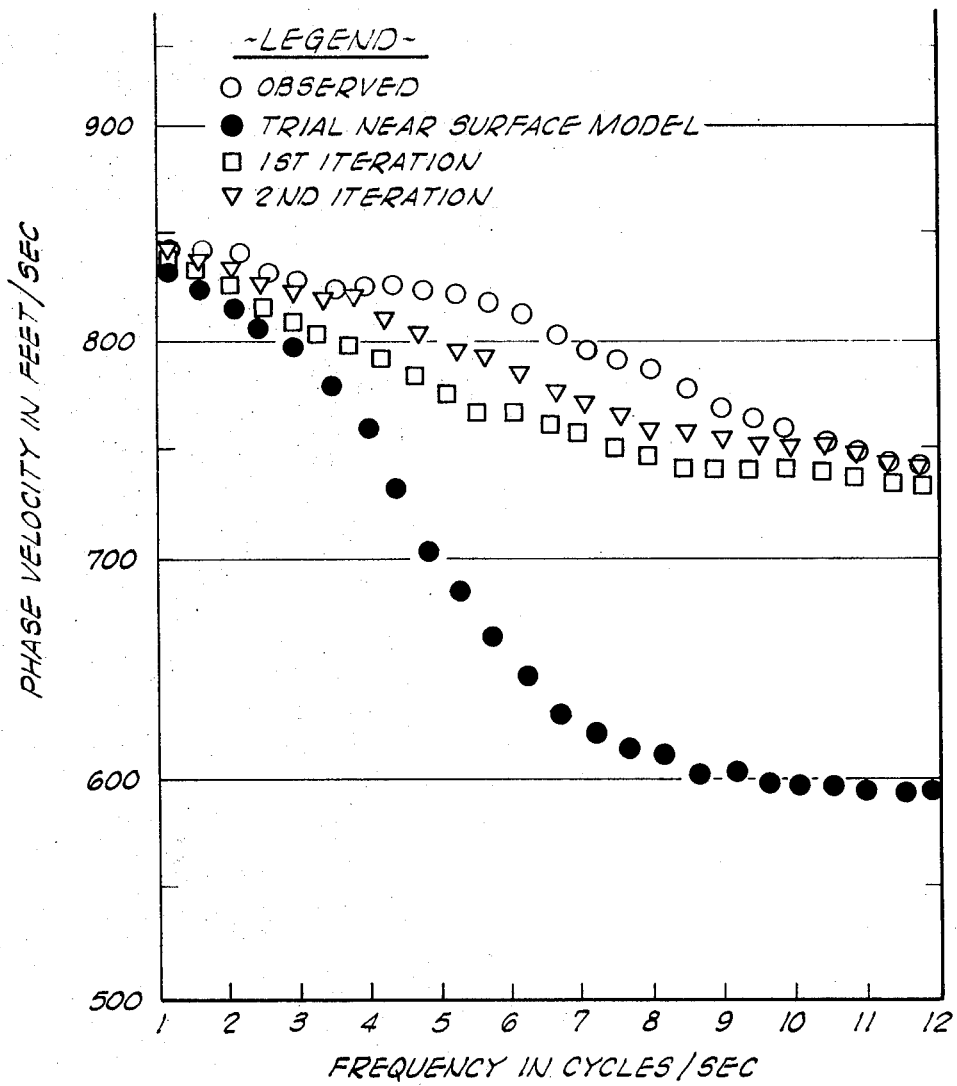
FIG. 2 is an illustrative example showing the plotted points of a particular observed phase velocity versus observed frequency relationship, the plotted points of a near surface model phase velocity versus near surface model frequency relationship, and a first iteration phase velocity versus first iteration frequency relationship and a second iteration phase velocity versus second iteration frequency relationship, illustrating the method of determining a calculated near surface model having a phase velocity versus frequency relationship corresponding to the observed phase velocity versus observed frequency relationship.

From the observed data and determined observed phase velocity, a plot or curve is constructed consisting of the observed phase velocity as a function of observed frequency. Shown in FIG. 2 is an illustrative example of an observed phase velocity in feet per second as a function of the observed frequency in cycles per second for a particular observed test location. It should be noted and, as shown in FIG. 2 and identified in the "Legend" thereon as "observed," a curve representing observed phase velocity as a function of observed frequency has not actually been constructed, but rather various points have been plotted since, in this particular step and in the further steps to be described below, the point plots are more representative of the actual method as utilized in practice. However, the point plots will sometimes be referred to below as a curve since they do represent the points through which a curve may be constructed. The near surface layer is then approximated by a two-layer near surface model, where the first layer represents the weathering layer and the second layer represents a substratum which is infinite in extent. The utilization of near surface models to investigate particular geophysical methods is well known in the art.

In general, three basic types of near surface models have been utilized in the past. One particular type of near surface model is referred to in the art as an "analog model" and, in essence, represents a method of studying propagation problems utilizing physical materials that may be molded to simulate an actual field problem with proper physical ratios for the simulation. The twodimensional analog model is a permanent facility which is built-up and utilized to facilitate the interpretation of various propagation problems which arise in the field. The theoretical basis for such a two-dimensional modeling has been described in an article by J. Oliver, F. Press and M. Ewing, 1954, entitled "Two-Dimensional Models Seismology:" *Geophysics*, Volume 19, pages 202–210 and depends on the peculiarity of wave propagation in thin plates.

One other type of near surface model which has been similarly utilized in the past is obtained by making up a reproducible synthetic output record, which would simulate that obtained from field work.

A third broad category of near surface models, which has been utilized in the past, is referred to in the art as a "mathematical model" and as the name suggests is computed theoretically utilizing standard propagation study techniques.

As indicated in FIG. 2, a particular trial near surface model is initially selected which has a phase velocity versus frequency curve or relationship approximating the observed phase velocity versus observed frequency curve or relationship as determined from the observed data. The points plotted in FIG. 2 representing the phase velocity versus frequency relationship of the trial near surface model are referred to and identified in the "Legend" thereon as "Trial Near Surface Model." It should be noted that the theoretical phase velocity versus frequency relationship for a particular trial near surface model utilizing the analog model technique is well known in the art, and is discussed in an article entitled "Dispersion of Surface Waves on Multi-Layered Media" (Second Paper) *Bulletin Seismographical Society of America*, Volume 43, pages 17 through 34, 1953, by Haskell, and therefore no further detailed description is included herein.

In the particular example illustrated in FIG. 2, the selected trial near surface model had the following determined parameters:

TABLE I

| PARAMETERS OF THE TRIAL MODEL | |
|---|---|
| Parameters of the Weathering Layer | |
| 1. Thickness | = 50 ft. |
| 2. Compressional Wave Velocity ($V_p$) | = 1533 ft./second |
| 3. Shear Wave Velocity ($V_s$) | = 617 ft./second |
| 4. Density (P) | = 2.0 |
| Parameters of the Substratum | |
| 1. Compressional Wave Velocity ($V_p$) | = 6800 ft./second |
| 2. Shear Wave Velocity ($V_s$) | = 920 ft./second |
| 3. Density (P) | = 2.0 |

If the model phase velocity versus model frequency relationship closely approximates the observed phase velocity versus observed frequency relationship, then the known parameters of the near surface model are determined to be the parameters of the weathering layer, and those parameters are then utilized to determine the time correction factor. In this example (illustrated in FIG. 2) had the model curve closely approximated the observed curve, the parameters of the weathering layer would be determined from the known parameters of the model (Table I) to be as follows:

| 1. Thickness | = 50 ft. |
|---|---|
| 2. Compressional Wave Velocity ($V_p$) | = 1533 ft./second |
| 3. Shear Wave Velocity ($V_s$) | = 617 ft./second |
| 4. Density (P) | = 2.0 |

However, as illustrated in FIG. 2, the model curve does not closely approximate the observed curve, at least within the limits of acceptable error. Therefore, it is necessary to determine a calculated curve using the model curve and the observed curve which more accurately or more nearly approximates the observed curve. The technique of fitting the two curves, the model curve and the observed curve, to determine the calculated curve is known generally in the art as "force fitting," and utilizes the method of "least squares." This method is well known in the art and in essence involves the determination of the slope of the two curves at a particular point on one axis and determining the difference between the two curves as measured along the perpendicular axis, in an effort to minimize the difference.

Illustrating the above described method and utilizing the example illustrated in FIG. 2, the parameters of the near surface model, more particularly the parameters of the weathering layer of the near surface model are varied while keeping the other near surface model parameters constant to determine a calculated near surface model. The phase velocity versus frequency relationship is calculated or determined for the calculated near surface model after each variance.

The resulting phase velocity curve for the calculated near surface model, referred to below as an "iteration phase velocity versus iteration frequency relationship" or simply as an "iteration phase velocity curve," is then compared with the observed phase velocity curve utilizing the method of least squares.

Various calculated near surface models are determined, in a manner as described above, to obtain a corresponding calculated near surface model having an iteration phase velocity versus iteration frequency relationship which approximates the observed phase velocity versus observed frequency relationship. When such a corresponding calculated near surface model has been determined, the parameters of the corresponding calculated near surface model are then determined and utilized as the parameters of the weathering layer.

For example, the parameters of the trial near surface model, as shown in Table I, were varied in a manner to obtain two resulting calculated or iteration phase velocity curves. These two calculated curves are shown in FIG. 2, and identified in the "Legend" thereon, and referred to below as the "first iteration" and the "second iteration." The phase velocity and the frequency of the first calculated near surface model are referred to below as "the first iteration phase velocity" and "the first iteration frequency." The phase velocity and the frequency of the second calculated near surface model are referred to below as "the second iteration phase velocity" and "the second iteration frequency."

In this example, the thickness of the trial near surface model was initially varied 66 percent and the compressional wave velocity and the shear wave velocity were each varied 20 percent, respectively. Using these parameters the first iteration phase velocity versus first iteration frequency relationship was determined and plotted

CUZ,1/32 FIG. 2.

To obtain a closer approximation to the observed phase velocity curve, the parameters of the trial near surface model were again varied in a manner similar to that described above. Using these last mentioned calculations, the second iteration phase velocity versus second iteration frequency relationship was determined and plotted in FIG. 2.

As shown in FIG. 2, the second iteration phase velocity curve, or the second computed variation of the trial near surface model phase velocity curve, closely approximates the observed phase velocity curve. The parameters of the calculated near surface model represented in FIG. 2 by the second iteration phase velocity curve were then determined to be as follows:

TABLE II

SECOND ITERATION
COMPUTED NEAR SURFACE MODEL

Parameters of the Weathering Layer

1. Thickness = 30.2 ft.
2. Compressional Wave Velocity ($V_p$) = 1853.9 ft./second
3. Shear Wave Velocity ($V_s$) = 740.8 ft./second
4. Density (P) = 2.0

Parameters of the Sub-Surface

1. Compressional Wave Velocity ($V_p$) = 6800 ft./second
2. Shear Wave Velocity ($V_s$) = 920 ft./second
3. Density (P) = 2.0

In this particular example, illustrated in FIG. 2, the parameters of the weathering layer of the observed test location were known and determined to be as follows:

TABLE III

OBSERVED TEST LOCATION PARAMETERS

Parameters of the Weathering Layer

1. Thickness = 30 ft.
2. Compressional Wave Velocity ($V_p$) = 1839 ft./second
3. Shear Wave Velocity ($V_s$) = 740 ft./second
4. Density (P) = 2.0

Parameters of the Sub-Surface

1. Compressional Wave Velocity ($V_p$) = 6800 ft./second
2. Shear Wave Velocity ($V_s$) = 920 ft./second
3. Density (P) = 2.0

The parameters listed in Tables II and III above illustrate an excellent correspondence between the parameters of the calculated near surface model represented by the second iteration phase velocity curve and the known parameters of the observed test location.

It will be apparent to those skilled in the art that additional iterations could be calculated in an effort to further minimize the differences between the calculated or iteration phase velocity curves and the observed phase velocity curve, thereby more nearly approximating the parameters of the observed weathering layer. It will also be apparent to those skilled in the art that the above described method of determining a calculated or iteration phase velocity curve which closely approximates the observed phase velocity curve, and subsequently determining the observed weathering layer parameters corresponding to that calculated near surface model could be easily carried out or performed by a digital computer. In this latter event, further iterations would not only be possible, but could be quickly and easily performed. In the event a digital computer is so utilized, it may be more desirable to use an initial trial "mathematical near surface model," rather than an "analog model" as has been used in the above described example.

The above described method for determining a calculated near surface model phase velocity curve approximating an observed test location phase velocity curve is repeated at various observed test locations over the earth's surface where the seismic prospecting is being conducted. More particularly, the above described method is repeated at observed test locations where geophones will be disposed and adapted to record reflected wave traces during subsequent seismic prospecting stages, as will be referred to below in greater detail. The parameters of the weathering layer at each observed test location are determined in a manner as described above, and these determined parameters are then utilized to calculate a corresponding time correction factor to be applied to the reflected wave trace, prior to the interpretation thereof. The calculation of the time correction factor, referred to above, utilizing the parameters of the weathering layer, and the subsequent utilization of that time correction factor to shift a particular reflected wave trace is well known in the art and no further description is required herein.

Figure 3:
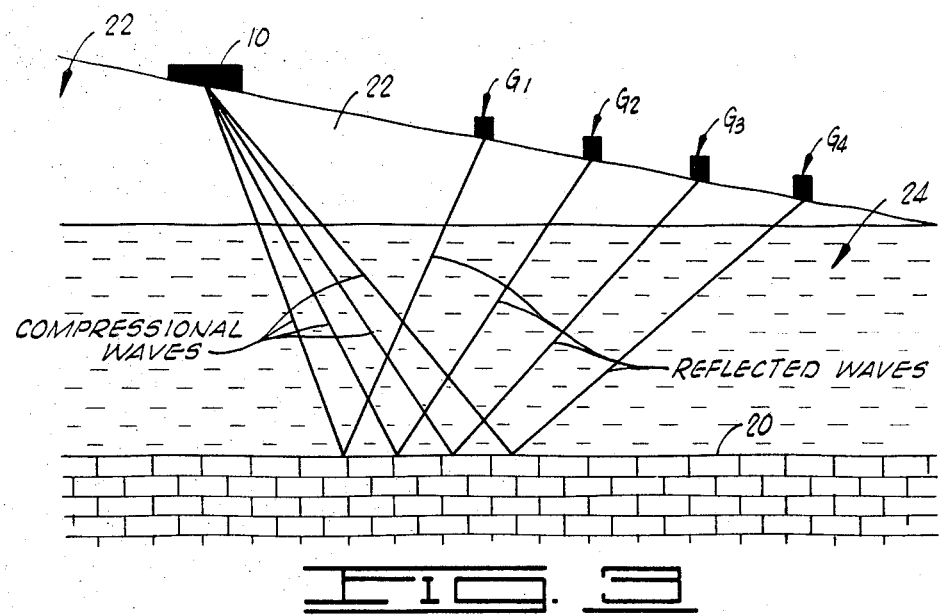
FIG. 3 is a typical geophysical prospecting arrangement adapted to detect and record reflection traces from a sub-surface interface.
Figure 4:
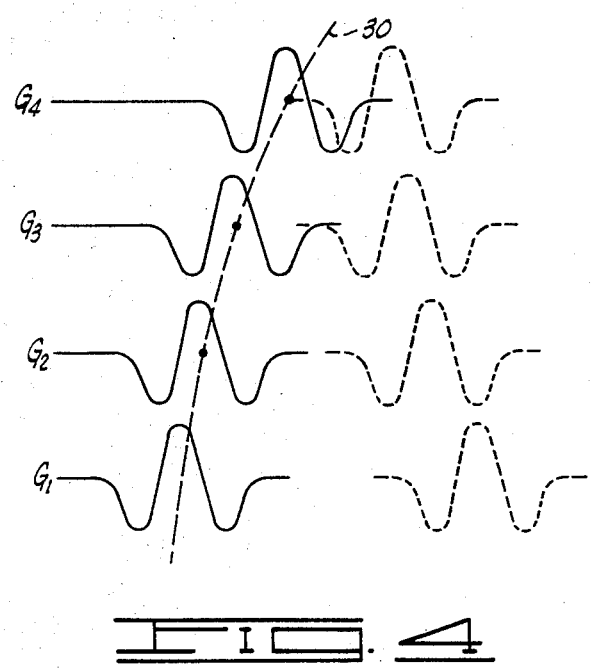
FIG. 4 shows the uncorrected observed reflection traces recorded at each geophone position of FIG. 3, and a corresponding corrected reflection trace for each geophone position.

FIGS. 3 and 4 illustrate how the above described method may be utilized in a particular seismic prospecting situation. As shown in FIG. 3, the source 10 and four geophones, designated in FIG. 3 as $G_1$, $G_2$, $G_3$ and $G_4$, are arranged and adapted such that the geophones, $G_1$ through $G_4$, will detect reflected wave traces from a horizontal sub-surface interface, designated in FIG. 3 by the numeral 20. The weathering layer is indicated in FIG. 3 by the general reference numeral 22 and the sub-surface or substratum is indicated by the general reference numeral 24.

In this example, the parameters of the weathering layer have been determined utilizing the method described above at the various positions where the geophones, $G_1$ through $G_4$, are located. Utilizing this data, the particular time correction factor which is to be applied to the reflection trace recorded at each geophone ($G_1$ through $G_4$) location has been determined. In other words, the time corrections to be applied to each reflected wave trace is calculated utilizing the parameters of the weathering layer determined for each geophone position, $G_1$ through $G_4$.

The reflection traces recorded at the geophone locations, $G_1$ through $G_4$, should appear to be in a particular relationship indicated by a hyperbolic interpretation line in order to indicate or be interpreted as a reflection from a horizontally disposed interface.

The reflection traces shown in dashed-lines in FIG. 4, and designated broadly by the general references, $G_1$ through $G_4$, indicate the particular reflection trace at each correspondingly numeraled geophone position $G_1$ through $G_4$ before the time correction factors have been applied thereto. As shown therein, the uncorrected wave traces (shown in dashed-lines) have an interrelationship, which according to the known rules of interpretation in the seismic prospecting art, a curved or angularly oriented sub-surface interface might be indicated, rather than the horizontally disposed interface 20, as shown in FIG. 3.

After applying the time correction factor, as determined utilizing the method described before, each reflection trace is then shifted on its respective horizontal axis an amount indicated by the particular time correction factor. The reflection traces, shown in solid-lines in FIG. 4, indicate the orientation of each reflection trace after the particular time correction factor has been applied thereto. As shown in FIG. 4, the corrected reflection traces (shown in solid lines) have a hyperbolically shaped interpretation line 30, thereby indicating a horizontally disposed interface.

It is thus apparent that unless the reflection traces recorded at various geophone locations, $G_1$ through $G_4$, are corrected in a manner which accurately considers the parameters of the weathering layer, a fictitious reflector and subsequent interpretation thereof would result. The fictitious reflector, referred to above, results from the fact that the velocity of the reflected wave in the weathering layer differs or changes considerably with respect to the velocity of the reflected wave in the substratum immediately underlying the weathering layer. As illustrated in FIG. 3, the thickness of the weathering layer varies considerably from one location to another and thus the time correction for each geophone position, $G_1$ through $G_4$, must be determined and applied to the reflected traces recorded at that geophone position.

As described above, the weathering layer has been discussed in its simplest form constituting a single, low velocity layer near the surface of the earth. It should be noted that in certain areas, complex zones do exist where the weathering layer is actually disposed in an intermediate position, or in other words, where some high velocity media generally over-lays the weathering zone or weathering layer. It will be apparent to those skilled in the art that the above described method could also be utilized to analyze such complex zones.

It should also be noted that although the above method has been described with a view toward the utilization of an analog near surface model, the method could also be utilized successfully with other forms of propagation models, particularly of the type known as the "mathematical near surface model," mentioned above. Since the varying of the various parameters of a chosen trial near surface model to obtain the iterations, as illustrated in FIG. 2, could be conveniently accomplished using a digital computer, it is apparent that in some instances the utilization of the "mathematical model" may lead to a more complete machine process.

Changes may be made in the apparatus or in the various steps of the method described herein without departing from the spirit and scope of the invention as defined in the following claims.

What is claimed is:

1. Apparatus for determining the observed frequency and the observed phase shift of a surface wave at a particular test location, the observed frequency and the observed phase shift being utilized to determine the parameters of a near surface layer of the earth, comprising:

means for generating a continuously varying frequency seismic signal through the earth;
a pair of detectors disposed at the test location adapted to detect the surface wave component of the seismic signal, the detectors being spaced a predetermined distance apart;
means for measuring the observed frequency of the surface wave detected by the two detectors; and
means for measuring the observed phase shift of the surface wave detected by the two detectors.

2. The apparatus of claim 1 wherein the means for measuring the observed frequency is further defined as being a frequency counter connected to each detector at the particular test location.

3. The apparatus of claim 1 wherein the means for measuring the observed phase shift is further defined as being an oscilloscope connected to each detector at the particular test location.

* * * * *